US009409506B2

(12) United States Patent
Sahashi

(10) Patent No.: US 9,409,506 B2
(45) Date of Patent: Aug. 9, 2016

(54) CONVEYANCE SEAT

(71) Applicant: TOYOTA BOSHOKU KABUSHIKI KAISHA, Aichi-ken (JP)

(72) Inventor: Hideo Sahashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/494,725

(22) Filed: Sep. 24, 2014

(65) Prior Publication Data
US 2015/0091361 A1    Apr. 2, 2015

(30) Foreign Application Priority Data
Sep. 30, 2013   (JP) .................................. 2013-203663

(51) Int. Cl.
*A47C 7/02* (2006.01)
*B60N 2/72* (2006.01)
*B60N 2/58* (2006.01)
*B60N 2/68* (2006.01)
*B60N 2/70* (2006.01)

(52) U.S. Cl.
CPC .. *B60N 2/72* (2013.01); *B60N 2/58* (2013.01); *B60N 2/5816* (2013.01); *B60N 2/68* (2013.01); *B60N 2/70* (2013.01)

(58) Field of Classification Search
CPC .......... A47C 7/40; A47C 31/02; A47C 7/185; B60N 2/72; B60N 2/58; B60N 2/5816; B60N 2/70
USPC .............................. 297/218.3, 452.59, 452.57
See application file for complete search history.

(56) References Cited

U.S. PATENT DOCUMENTS

| 3,273,877 | A | * | 9/1966 | Geller et al. ..................... 267/89 |
| 3,833,454 | A | * | 9/1974 | Ambrose ................. 297/452.57 |
| 5,647,635 | A | | 7/1997 | Aumond et al. |
| 5,893,579 | A | | 4/1999 | Kimura et al. |
| 7,669,929 | B2 | | 3/2010 | Simon et al. |
| 7,871,126 | B2 | | 1/2011 | Becker et al. |
| 8,240,759 | B2 | * | 8/2012 | Hobl et al. ................. 297/218.1 |
| 8,919,878 | B2 | * | 12/2014 | Sakamoto ................. 297/218.2 |

(Continued)

FOREIGN PATENT DOCUMENTS

| CN | 101362445 | 2/2009 |
| CN | 102673454 | 9/2012 |
| DE | 3001429 | 7/1980 |

(Continued)

OTHER PUBLICATIONS

Germany Office action, dated Dec. 3, 2014 along with an English translation thereof.

(Continued)

*Primary Examiner* — Laurie K Cranmer
(74) *Attorney, Agent, or Firm* — Greenblum & Bernstein P.L.C.

(57) ABSTRACT

A conveyance seat includes: a seat frame; a seat pad that covers the seat frame; and a seat cover that covers the seat pad and that is fixed to the seat frame. The seat pad has a U-shaped portion formed by a supporting portion, a side surface portion that is continuous with the supporting portion, and a tension adjusting portion that is continuous with the side surface portion, the tension adjusting portion having a protruding portion as a portion of the tension adjusting portion that protrudes toward the seat cover. The protruding portion abuts against the seat cover.

20 Claims, 3 Drawing Sheets

(56) References Cited

U.S. PATENT DOCUMENTS

2008/0174159 A1* 7/2008 Kojima et al. ............. 297/218.3
2013/0049433 A1* 2/2013 Kajihara et al. ......... 297/452.59

FOREIGN PATENT DOCUMENTS

| DE | 3633012 | 4/1987 | | |
|---|---|---|---|---|
| DE | 10201220643 | 5/2013 | | |
| GB | 2266660 A | * 11/1993 | ............. | A47C 31/02 |
| JP | 6-217840 | 8/1994 | | |
| JP | 2011-189783 | 9/2011 | | |
| JP | 2011-198783 | 9/2011 | | |
| JP | 2013-010423 | 1/2013 | | |

OTHER PUBLICATIONS

Office Action issued in China Counterpart Patent Appl. No. 201410503616.0, dated Jun. 3, 2016, along with an English translation thereof.

* cited by examiner

CONVEYANCE SEAT

INCORPORATION BY REFERENCE

The disclosure of Japanese Patent Application No. 2013-203663 filed on Sep. 30, 2013 including the specification, drawings and abstract is incorporated herein by reference in its entirety.

BACKGROUND OF THE INVENTION

1. Field of the Invention

The invention relates to a conveyance seat. More particularly, the invention relates to a conveyance seat in which a seat pad is covered by a seat cover.

2. Description of Related Art

Japanese Patent Application Publication No. 6-217840 (JP 6-217840 A) describes a conveyance seat provided with a seat frame, a seat pad, and a seat cover. The conveyance seat is normally configured such that the seat frame is covered by the seat pad, and the seat pad is covered by the scat cover. Also, the seat cover is normally connected to the seat frame by an end portion of the seat cover being engaged with the seat frame.

It is difficult to always make the seat frame, which constitutes the conveyance seat, as well as the seat pad and the seat cover exactly the same shape, because of manufacturing error in each seat cover and the like that is manufactured. With the related art, there may be slack in the seat cover due to manufacturing error. One way to get this slack out is to pull on the seat cover, but simply pulling on the seat cover may result in the conveyance seat having an outer shape that was not intended, due to the seat pad deforming or the like.

SUMMARY OF THE INVENTION (US)

The invention provides a conveyance seat in which slack in a seat cover that covers a seat pad is able to be inhibited.

One aspect of the invention relates to a conveyance seat including: a seat frame; a seat pad that covers the seat frame; and a seat cover that covers the seat pad and that is fixed to the seat frame. The seat pad has a U-shaped portion formed by a supporting portion, a side surface portion that is continuous with the supporting portion, and a tension adjusting portion that is continuous with the side surface portion, the tension adjusting portion having a protruding portion as a portion of the tension adjusting portion that protrudes toward the seat cover. The scat pad may be a molding having the U-shaped portion.

According to the aspect described above, it is possible to inhibit slack in a seat cover that covers a seat pad of a conveyance seat.

SUMMARY OF THE INVENTION (DE,CN)

The invention provides a conveyance seat in which slack in a seat cover that covers a seat pad is able to be inhibited.

One aspect of the invention relates to a conveyance seat including: a seat frame; a seat pad that covers the seat frame; and a seat cover that covers the seat pad and that is fixed to the seat frame. The seat pad has a U-shaped portion formed by a supporting portion, a side surface portion that is continuous with the supporting portion, and a tension adjusting portion that is continuous with the side surface portion, the tension adjusting portion having a protruding portion as a portion of the tension adjusting portion that protrudes toward the seat cover. The seat pad may be a molding having the U-shaped portion.

According to this aspect, force is applied from the protruding portion to the seat cover. Therefore, slack in seat cover is able to be inhibited. In addition, slack in the seat cover is able to be inhibited without increasing the number of parts. Also, a seat pad having a U-shaped portion in a molded state is used, so the tension of the seat cover is able to be adjusted entirely by the tilting of a tension adjusting portion. Therefore, the tension of the seat cover is able to be adjusted, while inhibiting the outer shape of the side surface portion of the conveyance seat from largely deforming.

In the aspect described above, the U-shaped portion may be formed on a front end side of the conveyance seat, and the protruding portion may be pushed on from below by the seat cover.

According to this structure, the portion where the protruding portion applies force to the seat cover is not easily visually recognizable. Therefore, it is not necessary to provide a cover or the like so that an uneven shape that may occur in the seat cover is not visually recognized. Also, slack in the seat cover is able to be inhibited, while maintaining the outer shape of the front end side of the seat cushion, which is easily visually recognizable.

In the aspect described above, the seat cover may include a bag portion, and the U-shaped portion may be covered by the bag portion.

According to this structure, slack in the seat cover is able to be effectively inhibited.

According to the aspect described above, it is possible to inhibit slack in a seat cover that covers a seat pad of a conveyance seat.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
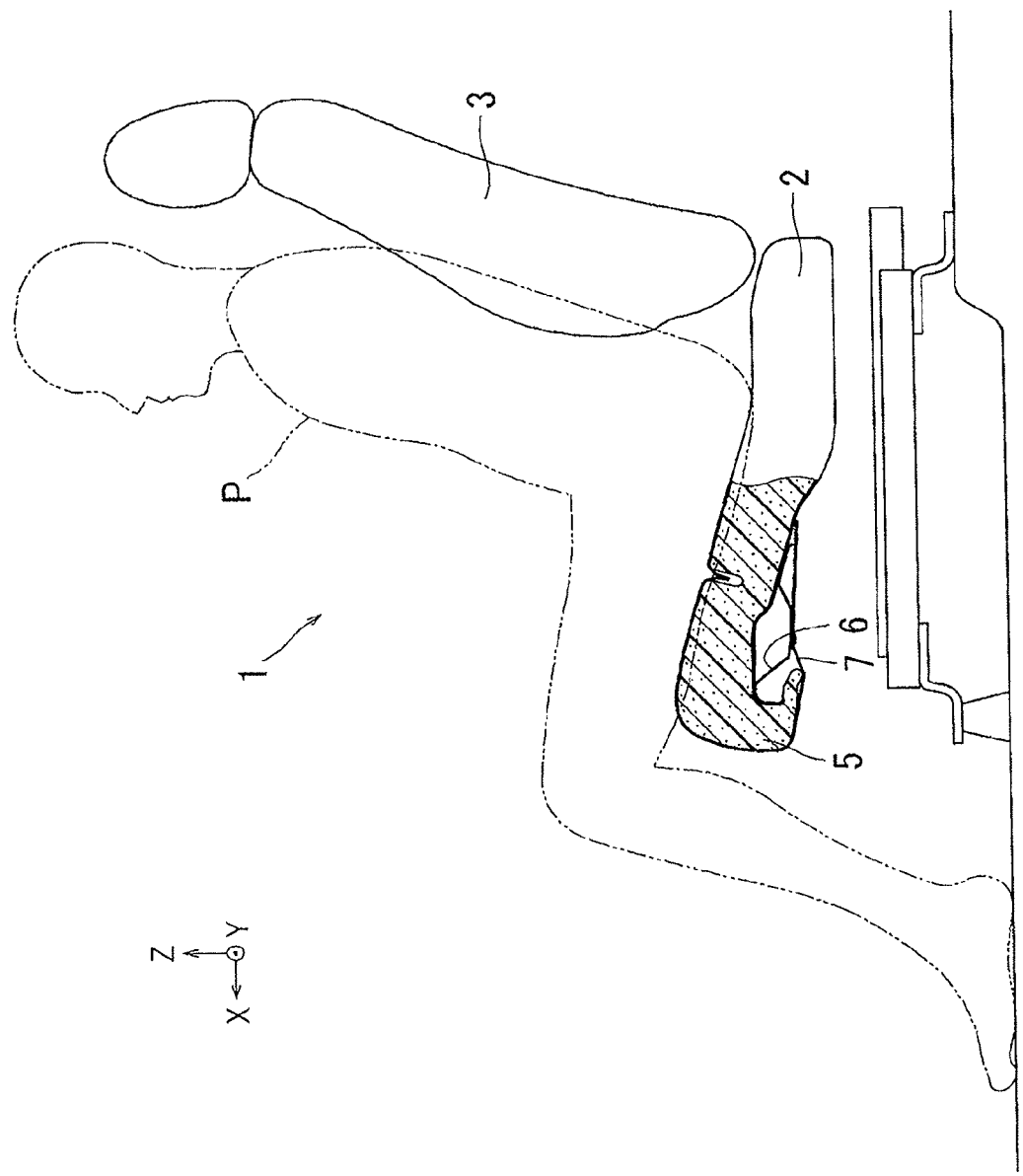
FIG. 1 is a side view of a conveyance seat to which the invention has been applied, showing the inside of a front half of a seat cushion.

Hereinafter, example embodiments of the invention will be described with reference to the drawings when appropriate. Regarding directions such as a front-rear (longitudinal) direction, an up-down (vertical) direction, and a left-right (lateral) direction in this specification, X is designated as the forward direction, Y is designated as the left direction, and Z is designated as the upward direction, in FIG. 1. For example, normally the side that is in the field of view when an occupant P is seated is forward, and the side behind the head, which is not in the field of view, is rearward. The left-hand side of the occupant P in FIG. 1 is the left direction. A conveyance seat 1 in this example embodiment is a vehicle seat. The conveyance seat 1. in this example embodiment includes a seat cushion 2 that has a supporting surface that opposes mainly the thighs of the occupant P, and a seatback 3 that has a supporting surface that opposes mainly the back of the occupant P. Also, with the conveyance seat 1, a seat pad 5 is arranged covering a seat frame 6 that serves as a frame, and a seat cover 7 is arranged covering the seat pad 5. The seat cover 7 serves to push the seat pad 5 against the seat frame 6, and one end of the seat cover 7 is fixed to the seat frame 6. Also, the seat pad 5 is a foam molded body, typically urethane foam, which is used in a typical conveyance seat 1. Further, a back surface member 58 is provided on a side of the seat pad 5 that faces the seat frame 6, which increases the rigidity. The seat pad 5 has an appropriate elastic force and is able to support the occupant P appropriately. The conventionally used seat pad 5 includes a supporting portion 51, and a side surface portion 52 that extends downward from an end portion of the supporting portion 51. In this example embodiment, a tension adjusting portion 53 that extends curved or bent toward the rear from an end portion of the side surface portion 52 is provided. Consequently, a portion with a U-shaped cross-section is provided, and a protruding portion 53a is provided on a portion of the adjusting portion.

Figure 2:
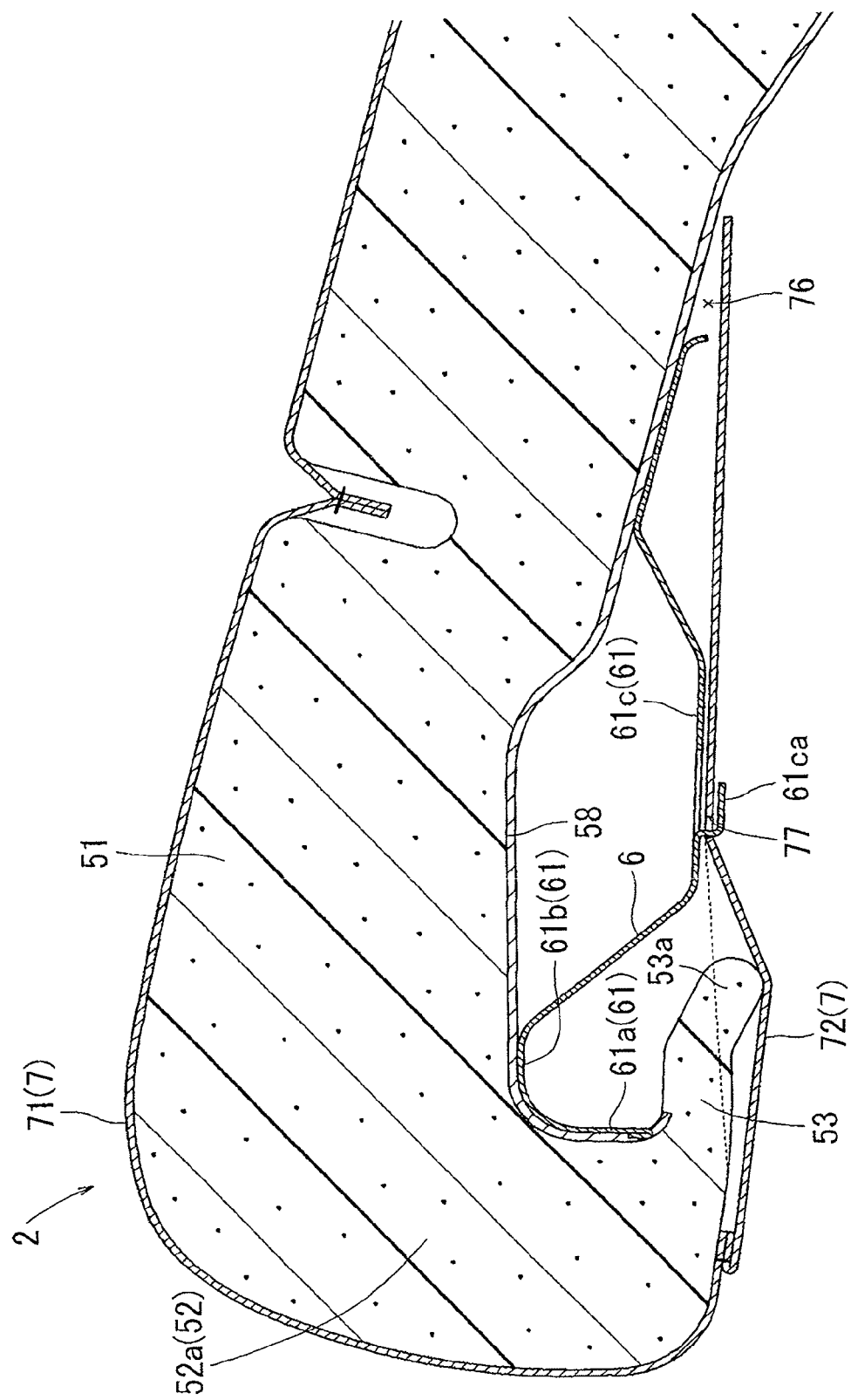
FIG. 2 is an enlarged sectional view from the side of a seat cushion front end portion of the conveyance seat to which the invention has been applied.

In this example embodiment, a portion on the front end side of the seat cushion 2 will be described in greater detail. The seat pad 5 includes the supporting portion 51 that opposes mainly the thighs and forms a supporting surface. The seat pact 5 also includes, as the side surface portion 52 that is continuous with the supporting portion 51, a front-side side surface portion 52a that extends downward from a front end of the supporting portion 51, a right-side side surface portion 52b that extends downward from a right end of the supporting portion 51, and a left-side side surface portion 52c that extends downward from a left end of the supporting portion 51. In particular, the tension adjusting portion 53 that extends toward the rear from a lower end of the front-side side surface portion 52a is provided on the front-side side surface portion 52a. By providing this tension adjusting portion 53, tension is applied to the seat cover 7 at a position between a lower end of the front-side side surface portion 52a and a portion where the seat cover 7 is fixed. The tension adjusting portion 53 has a portion as a protruding portion 53a that protrudes toward the seat cover 7. More specifically, the protruding portion 53a is formed in a shape having V-shaped cross section by curving or bending an end portion of the tension adjusting portion 53 toward the seat cover 7. The protruding portion 53a is a portion that abuts against the seat cover 7, and serves to inhibit slack in the seat cover 7. The tension adjusting portion 53 is able to be displaced, and is able to be displaced upward in FIG. 2. Therefore, excessive tension is inhibited from being applied to the seat cover 7, so appropriate tension is able to be applied. The seat pad 5 in this example embodiment has a U-shaped cross-section when foam molding is complete, by forming the supporting portion 51, the front-side side surface portion 52a, and the tension adjusting portion 53. The seat pad 5 does not have a U-shaped cross-section as a result of being pushed on by the seat cover 7 having L-shaped cross section. In other words, the seat pad is a molding having the U-shaped cross section.

Figure 3:
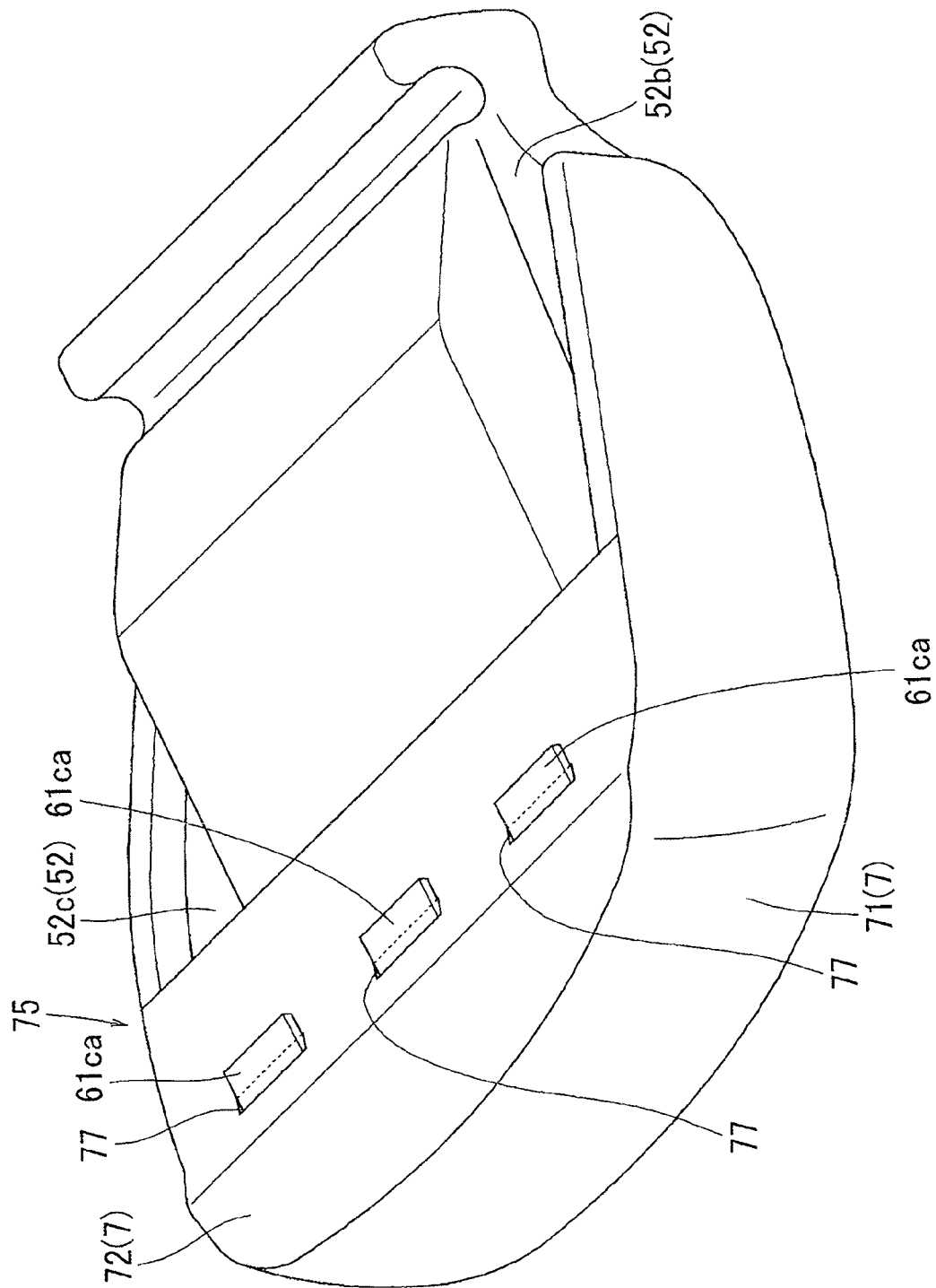
FIG. 3 is a perspective view of the seat cushion of the conveyance seat of the invention upside down.

The seat cover 7 of the seat cushion 2 in this example embodiment includes an upper-side cover portion 71 that is a portion that covers the front and left and right sides, in addition to the supporting surface. Also, a pocket portion 75 is provided by connecting a planar-shaped lower-side cover portion 72 together with the upper-side cover portion 71. This pocket portion 75 is a bag portion that has an open portion 76 into which the front end portion of the seat pad 5 is inserted (see FIG. 3). Also, a retaining hole 77 that engages with an engaging portion 61ca provided on the seat frame 6, is provided in the lower-side cover portion 72.

A front panel 61 is provided on the seat frame 6 that forms the frame of the seat cushion 2 of this example embodiment. The front panel 61 has a front-side supporting portion 61a that extends in the vertical (up-down) and lateral (left-right) directions to support the front-side side surface portion 52a of the seat pad 5, an upper-side supporting portion 61b that extends in the longitudinal (front-rear) and lateral (left-right) directions to support the supporting surface of the seat pad 5, and an engaging supporting portion 61c that is positioned below the upper-side supporting portion 61b and includes the engaging portion 61ca to engage with the retaining hole 77. The engaging portion 61ca of this example embodiment is formed by partially cutting a tab out of the front panel 61 and raising it in an L-shape. In this example embodiment, the engaging portion 61ca is a portion for fixing the seat cover 7.

When assembling the conveyance seat 1 of the example embodiment, first the front end of the seat frame 6 is covered by the portion of the seat pad 5 that has the U-shaped cross-section. After the seat frame 6 is arranged so that it is covered by the seat pad 5, the seat cover 7 is fitted on such that the front end portion of the seat pad 5 fits into the open portion 76 provided in the pocket portion 75 of the seat cover 7. Then the retaining hole 77 provided in the seat pad 5 is engaged with the engaging portion 61ca provided on the seat cover 7, and the position of the seat cover 7 is set to a specific location by fixing the other areas as necessary. With the conveyance seat 1 assembled in this way, the positions of the front-side supporting portion 61a and the engaging portion 61ca of the seat frame 6 will not change relative to one another, but the protruding portion 53a provided on the tension adjusting portion 53 abuts against the seat cover 7 in a position between the front-side supporting portion 61a and the engaging portion 61ca, so tension is applied to the seat frame 6. Therefore, slack in the seat cover 7 is able to be inhibited. The protruding portion 53a has a region that protrudes farther toward the seat cover 7 than a position where the lower end of the front-side side surface portion 52a and the engaging portion 61ca are connected in a straight line (see the broken line in FIG. 2).

With the conveyance seat 1 of this example embodiment, slack in the seat cover 7 is able to be inhibited. In particular, the seat pad 5 the seat pad 5 is formed having a portion with a U-shaped cross-section on the front end side, so slack in the seat cover 7 can be inhibited, while the outer shape of the front-side side surface of the seat cushion 2 is inhibited from deforming. Also, slack in the seat cover 7 is adjusted by the elastic force of the seat cushion 2, so appropriate tension is able to be applied to the seat cushion 2, enabling wrinkles to be inhibited from forming on the side surface and the supporting surface of the seat cover 7. Further, the protruding portion 53a is provided extending at an angle farther downward from a portion extending toward the rear from front-side side surface portion 52a, so the seat pad 5 is able to easily abut against the seat cover 7 at a position between the lower end of the front-side side surface portion 52a of the seat pad 5 and the portion where the seat cover 7 is fixed. Also, the tension of the seat cover 7 is adjusted such that the inside of the bag portion becomes wider, so slack in the seat cover 7 is able to be inhibited at portions on the front side of the left- and right-side side surfaces and the front-side side surface, which are portions that are easily visually recognizable. Also, the portion where the seat cover 7 abuts against the tension adjusting portion 53 is positioned on the lower side surface of the conveyance seat 1, so the curve or bend of the seat cover 7 at the abutting portion is not easily visually recognized. Therefore, it is not necessary to design the conveyance seat 1 so that the curve or bend of the seat cover 7 is not visually recognized. Also, the seat pad 5 serves to inhibit slack in the seat cover 7, so an increase in the number of parts is able to be inhibited. Further, with the surface on the side opposite the side where the tension adjusting portion 53 faces the seat cover 7, the tension adjusting portion 53 does not contact the seat frame 6, so the tension adjusting portion 53 will easily deform. Also, the back surface member 58 is provided on the supporting portion 51, and the front-side side surface portion 52a, and the base portion of the tension adjusting portion 53, of the portion of the seat pad 5 that has the U-shaped cross-section, but the back surface member 58 is not provided on the tip end side of the tension adjusting portion 53. Therefore, the tension adjusting portion 53 is able more easily to inhibit slack in the seat cover appropriately, while maintaining the outer shape of the front-side side surface of the seat cushion 2. The front end portion of the seat pad 5 is curved or bent near the upper end portion and near the lower end portion of the front-side supporting portion 61a of the front panel 61, so the front-side side surface portion 52a of the seat pad 5 is able to be sufficiently supported by the front-side supporting portion 61a of the front panel 61. Therefore, the outer shape of the front-side side surface portion 52a is able to be inhibited from deforming.

Heretofore, one example embodiment of the conveyance seat of the invention has been described, but the invention may also be carried out in a variety of other modes aside from that of the example embodiment described above. For example, the seat cushion includes a tension adjusting portion and a protruding portion, but the conveyance seat is not limited to this. The seatback may also include a protruding portion. In this case, the seat pad preferably wraps around an upper frame and a side frame. Also, when the seatback is provided with the protruding portion, it is desirable to provide a cover on the outside of the abutting portion so that it is not easy to visually recognize that the seat cover is being pulled on. Further, the invention is not limited to tension being applied between the front-side side surface portion and the seat cover fixing portion. For example, tension may also be applied between the right-side side surface portion and the seat cover fixing portion, and between the left-side side surface portion and the seat cover fixing portion. Further, when the seatback is provided with the protruding portion, tension may also be applied to the seat cover between the upper-side side surface portion and the seat cover fixing portion. Also, it is not necessary that the pocket portion be closed except for the open portion into which the seat frame is inserted. As long as it does not interfere with the object of the invention, an opening or the like may also be formed in a portion of a bottom surface or the like. Also, the protruding portion is not limited to being formed having a V-shaped cross-section. For example, the protruding portion may also have a T-shaped cross-section, or any other shape as long as it does not interfere with the object of the invention. Moreover, the seat cover and the seat frame do not have to be limited to being fixed together by engaging the hole provided in the seat cover with an engaging portion provided by partially cutting a tab out of the seat frame and raising it. For example, a hook may be attached to the seat cover, and the hook may be retained by the seat frame, or any one of various other modes may be employed as long as it do not interfere with the object of the invention. Also, as a mode that differs from the example embodiment, the seat frame may be arranged adjacent to the tension adjusting portion, or the back surface member may be provided on a surface of the tension adjusting portion that is on the seat frame side. Further, the conveyance is not limited to a vehicle, but may also be a conveyance that flies through the air (i.e., an aircraft) such as an airplane or a helicopter, or a conveyance that travels on or under water such as a marine vessel or a submersible.

As detailed above, one aspect of the invention relates to a conveyance seat including: a seat frame; a seat pad that covers the seat frame; and a seat cover that covers the seat pad and that is fixed to the seat frame. The seat pad has a U-shaped portion formed by a supporting portion, a side surface portion that is continuous with the supporting portion, and a tension adjusting portion that is continuous with the side surface portion, the tension adjusting portion having a protruding portion as a portion of the tension adjusting portion that protrudes toward the seat cover. The seat pad may be a molding having the U-shaped portion.

According to this aspect, force is applied from the protruding portion to the seat cover. Therefore, slack in seat cover is able to be inhibited. In addition, slack in the seat cover is able to be inhibited without increasing the number of parts. Also, a seat pad having a U-shaped portion in a molded state is used, so the tension of the seat cover is able to be adjusted entirely by the tilting of a tension adjusting portion. Therefore, the tension of the seat cover is able to be adjusted, while inhibiting the outer shape of the side surface portion of the conveyance seat from largely deforming.

In the aspect described above, the U-shaped portion may be formed on a front end side of the conveyance seat, and the protruding portion may be pushed on from below by the seat cover.

According to this structure, the portion where the protruding portion applies force to the seat cover is not easily visually recognizable. Therefore, it is not necessary to provide a cover or the like so that an uneven shape that may occur in the seat cover is not visually recognized. Also, slack in the seat cover is able to be inhibited, while maintaining the outer shape of the front end side of the seat cushion, which is easily visually recognizable.

In the aspect described above, the seat cover may include a bag portion, and the U-shaped portion may be covered by the bag portion.

According to this structure, slack in the seat cover is able to be effectively inhibited.

What is claimed is:
1. A conveyance seat comprising:
   a seat frame;
   a seat pad that covers the seat frame; and
   a seat cover that covers the seat pad and that is fixed to the seat frame, wherein:
      the seat pad has a U-shaped portion comprising a supporting portion, a side surface portion that is continuous with the supporting portion, and a tension adjusting portion that is continuous with the side surface portion, the tension adjusting portion having a protruding portion that protrudes toward the seat cover, the protruding portion extending from the tension adjusting portion in a direction different from an extending direction of a portion of the tension adjusting portion other than the protruding portion, the protruding portion having a predetermined shape that extends towards the seat cover; and
   a contacting part of the protruding portion contacts the seat cover, and parts of the protruding portion, other than the contacting part, provided on opposite sides of the contacting portion, are spaced from the seat cover.
2. The conveyance seat according to claim 1, wherein the seat pad is a molding having the U-shaped portion.

3. The conveyance seat according to claim 1, wherein:
the U-shaped portion is provided on a front end side of the conveyance seat; and
the protruding portion is pushed on from below by the seat cover.

4. The conveyance seat according to claim 1, wherein
the seat cover includes a bag portion; and
the U-shaped portion is covered by the bag portion.

5. The conveyance seat according to claim 1, wherein a freestanding shape of the seat pad is U-shaped.

6. The conveyance seat according to claim 1, wherein a shape of the seat pad is independent of the covering of the seat pad by the seat cover.

7. The conveyance seat according to claim 1, the protruding portion of the tension adjusting portion extends from a body of the tension adjusting portion and defines a generally V-shaped cross-section with respect to the body of the tension adjusting portion, the body comprising a portion of the tension adjusting portion other than the protruding portion.

8. The conveyance seat according to claim 1, wherein a U shape of the U-shaped portion of the seat pad is independent of the seat pad being part of the conveyance seat.

9. The conveyance seat according to claim 1, wherein a U shape of the U-shaped portion of the seat pad is maintained independently of application of an external force to the seat pad.

10. The conveyance seat according to claim 1, wherein the seat pad comprises a preformed foam body.

11. A conveyance seat comprising:
a seat frame;
a seat pad that covers the seat frame; and
a seat cover that covers the seat pad and that is fixed to the seat frame, wherein:
the seat pad has a U-shaped portion comprising a supporting portion, a side surface portion that is continuous with the supporting portion, and a tension adjusting portion that is continuous with the side surface portion, the tension adjusting portion having a protruding portion that protrudes toward the seat cover, the protruding portion extending from the tension adjusting portion in a direction different from an extending direction of a portion of the tension adjusting portion other than the protruding portion, the protruding portion having a predetermined shape that extends towards the seat cover, a lower surface of the tension adjusting portion having a shape that defines a downwardly opening depression that faces the seat cover; and
a contacting part of the protruding portion contacts the seat cover.

12. The conveyance seat according to claim 11, wherein the seat pad is a molding having the U-shaped portion.

13. The conveyance seat according to claim 11, wherein:
the U-shaped portion is provided on a front end side of the conveyance seat; and
the protruding portion is pushed on from below by the seat cover.

14. The conveyance seat according to claim 11, wherein
the seat cover includes a bag portion; and
the U-shaped portion is covered by the bag portion.

15. The conveyance seat according to claim 11, wherein a freestanding shape of the seat pad is U-shaped.

16. The conveyance seat according to claim 11, wherein a shape of the seat pad is independent of the covering of the seat pad by the seat cover.

17. The conveyance seat according to claim 11, the protruding portion of the tension adjusting portion extends from a body of the tension adjusting portion and defines a generally V-shaped cross-section with respect to the body of the tension adjusting portion, the body comprising a portion of the tension adjusting portion other than the protruding portion.

18. The conveyance seat according to claim 11, wherein a U shape of the U-shaped portion of the seat pad is independent of the seat pad being part of the conveyance seat.

19. The conveyance seat according to claim 11, wherein a U shape of the U-shaped portion of the seat pad is maintained independently of application of an external force to the seat pad.

20. The conveyance seat according to claim 11, wherein the seat pad comprises a preformed foam body.

* * * * *